US011068273B2

(12) United States Patent
Al Sheikh et al.

(10) Patent No.: US 11,068,273 B2
(45) Date of Patent: Jul. 20, 2021

(54) SWAPPING AND RESTORING CONTEXT-SPECIFIC BRANCH PREDICTOR STATES ON CONTEXT SWITCHES IN A PROCESSOR

(71) Applicant: Microsoft Technology Licensing, LLC, Redmond, WA (US)

(72) Inventors: Rami Mohammad Al Sheikh, Morrisville, NC (US); Michael Scott McIlvaine, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/558,658

(22) Filed: Sep. 3, 2019

(65) Prior Publication Data

US 2021/0064378 A1 Mar. 4, 2021

(51) Int. Cl.
*G06F 9/38* (2018.01)
*G06F 9/30* (2018.01)
*G06F 9/54* (2006.01)
*G06F 12/0891* (2016.01)

(52) U.S. Cl.
CPC .......... *G06F 9/3846* (2013.01); *G06F 9/3005* (2013.01); *G06F 9/544* (2013.01); *G06F 12/0891* (2013.01)

(58) Field of Classification Search
None
See application file for complete search history.

(56) References Cited

U.S. PATENT DOCUMENTS

| 5,860,017 A * | 1/1999 | Sharangpani ......... G06F 9/3804 |
| | | 712/218 |
| 7,552,255 B1 * | 6/2009 | George ............... G06F 12/1036 |
| | | 710/58 |
| 10,540,181 B2 * | 1/2020 | Mukherjee ............ G06F 9/3842 |

(Continued)

OTHER PUBLICATIONS

Kocher, Paul, et al., "Spectre Attacks: Exploiting Speculative Execution," IEEE Symposium on Security and Privacy, May 2019, IEEE, 19 pages.

(Continued)

*Primary Examiner* — Michael Sun
(74) *Attorney, Agent, or Firm* — Withrow & Terranova, PLLC

(57) ABSTRACT

Swapping and restoring context-specific branch predictor states on context switches in a processor. A branch prediction circuit in an instruction processing circuit of a processor includes a private branch prediction memory configured to store branch prediction states for a context of a process being executed. The branch prediction states are accessed by the branch prediction circuit to predict outcomes of its branch instructions of the process. In certain aspects, when a context switch occurs in the processor, branch prediction states stored in a private branch prediction memory and associated with the current, to-be-swapped-out context, are swapped out of the private branch prediction memory to the shared branch prediction memory. Branch prediction states in the shared branch prediction memory previously stored (i.e., swapped out) and associated with to-be-swapped-in context for execution are restored in the private branch prediction memory to be used for branch prediction.

21 Claims, 10 Drawing Sheets

(56) References Cited

U.S. PATENT DOCUMENTS

| | | | |
|---|---|---|---|
| 2007/0288735 A1 | 12/2007 | Vasekin et al. | |
| 2014/0019738 A1* | 1/2014 | Kataoka | G06F 9/3851 |
| | | | 712/240 |
| 2015/0268957 A1 | 9/2015 | Bonanno et al. | |
| 2015/0347135 A1* | 12/2015 | Gschwind | G06F 9/3861 |
| | | | 712/239 |
| 2017/0286421 A1* | 10/2017 | Hayenga | G06F 9/3842 |
| 2019/0361707 A1* | 11/2019 | Vougioukas | G06F 9/30145 |

OTHER PUBLICATIONS

Sadooghi-Alvandi, Maryam, et al., "Toward Virtualizing Branch Direction Prediction," Design, Automation and Test in European Conference and Exhibition, Mar. 2012, IEEE, 6 pages.
Vougioukas, Illias, et al., "BRB: Mitigating Branch Predictor Side-Channels," International Symposium on High Performance Computer Architecture, Feb. 2019, IEEE, 12 pages.
International Search Report and Written Opinion Issued in PCT Application No. PCT/US20/037985, dated Sep. 25, 2020, 10 Pages.

* cited by examiner

200 ↘

```
┌─────────────────────────────────────────────────────────────────┐
│ SPECULATIVELY PREDICTING AN OUTCOME OF A BRANCH                 │─202
│ INSTRUCTION (106F) IN A CURRENT PROCESS EXECUTING IN THE        │
│ INSTRUCTION PROCESSING CIRCUIT (104), BASED ON A BRANCH         │
│ PREDICTION STATE (138(0)-138(B)) AMONG AT LEAST ONE BRANCH      │
│ PREDICTION STATE (138(0)-138(B)) OF A CURRENT CONTEXT OF THE    │
│ CURRENT PROCESS IN A PRIVATE BRANCH PREDICTION MEMORY (136)     │
│ ASSOCIATED WITH THE BRANCH INSTRUCTION (106F), THE PRIVATE      │
│ BRANCH PREDICTION MEMORY (136) CONFIGURED TO STORE AT LEAST     │
│ ONE BRANCH PREDICTION STATE (138(0)-138(B)) FOR THE CURRENT     │
│ CONTEXT OF THE CURRENT PROCESS TO BE EXECUTED IN AN             │
│ INSTRUCTION PROCESSING CIRCUIT (104) OF A PROCESSOR (102)       │
└─────────────────────────────────────────────────────────────────┘
                              ▼
┌─────────────────────────────────────────────────────────────────┐
│ RECEIVING A PROCESS IDENTIFIER (ID) (150) IDENTIFYING A NEW     │─204
│ CONTEXT SWAPPED INTO THE INSTRUCTION PROCESSING CIRCUIT (104)   │
└─────────────────────────────────────────────────────────────────┘
                              ▼
┌─────────────────────────────────────────────────────────────────┐
│ DETERMINING IF THE PROCESS IDENTIFIER (150) INDICATES A NEW     │─206
│ CONTEXT DIFFERENT FROM THE CURRENT CONTEXT SWAPPED INTO THE     │
│ INSTRUCTION PROCESSING CIRCUIT (104)                            │
└─────────────────────────────────────────────────────────────────┘
                              ▼
┌─────────────────────────────────────────────────────────────────┐
│ IN RESPONSE TO THE PROCESS IDENTIFIER (150) INDICATING THE NEW  │─208
│ CONTEXT DIFFERENT FROM THE CURRENT CONTEXT SWAPPED INTO THE     │
│ INSTRUCTION PROCESSING CIRCUIT (104):                           │
└─────────────────────────────────────────────────────────────────┘
                              ▼
┌─────────────────────────────────────────────────────────────────┐
│ CAUSING AT LEAST ONE BRANCH PREDICTION STATE (146()(0)-146()(B))│─210
│ ASSOCIATED WITH THE NEW CONTEXT 144(C)-144(C) TO BE STORED AS   │
│ AT LEAST ONE BRANCH PREDICTION STATE (138(0)-138(B)) IN THE     │
│ PRIVATE BRANCH PREDICTION MEMORY (136)                          │
└─────────────────────────────────────────────────────────────────┘
                              ▼
┌─────────────────────────────────────────────────────────────────┐
│ CAUSING AT LEAST ONE BRANCH PREDICTION STATE (138(0)-138(B)) IN │─212
│ THE PRIVATE BRANCH PREDICTION MEMORY (136) TO BE STORED AS AT   │
│ LEAST ONE BRANCH PREDICTION STATE (146()(0)-146()(B)) IN A      │
│ SHARED BRANCH PREDICTION MEMORY (142), IN RESPONSE TO THE       │
│ PROCESS IDENTIFIER (ID) (150) INDICATING THE NEW CONTEXT        │
│ DIFFERENT FROM THE CURRENT CONTEXT SWAPPED INTO THE             │
│ INSTRUCTION PROCESSING CIRCUIT (104)                            │
└─────────────────────────────────────────────────────────────────┘
```

FIG. 2

SWAPPING AND RESTORING CONTEXT-SPECIFIC BRANCH PREDICTOR STATES ON CONTEXT SWITCHES IN A PROCESSOR

FIELD OF THE DISCLOSURE

The technology of the disclosure relates to processing of instructions for execution in a computer processor ("processor"), more particularly, to branch prediction of branch instructions in a processor.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "software instructions" to perform operations based on data and generate a result, which is a produced value. An instruction that generates a produced value is a "producer" instruction. The produced value may then be stored in a memory, provided as an output to an input/output ("I/O") device, or made available (i.e., communicated) as an input value to another "consumer" instruction executed by the CPU, as examples. Thus, a consumer instruction is dependent on the produced value produced by a producer instruction as an input value to the consumer instruction for execution.

A processor can employ instruction pipelining as a processing technique whereby the throughput of computer instructions being executed may be increased by splitting the processing of each instruction into a series of steps. These steps are executed in an execution pipeline composed of multiple stages. Optimal processor performance may be achieved if all stages in an execution pipeline are able to process instructions concurrently and sequentially as the instructions are ordered in the instruction pipeline(s). However, structural hazards can occur in an instruction pipeline where the next instruction cannot be executed without leading to incorrect computation results. For example, a control hazard may occur as a result of execution of a control flow instruction that causes a precise interrupt in the processor. One example of a control flow instruction that can cause a control hazard is a conditional branch instruction. A conditional branch instruction may redirect the flow path of instruction execution based on an outcome evaluated when the control branch instruction is executed. As a result, the processor may have to stall the fetching of additional instructions until a conditional control instruction has executed, resulting in reduced processor performance and increased power consumption.

One approach for maximizing processor performance involves utilizing a prediction circuit to speculatively predict the result of a conditional branch instruction. For example, the prediction of whether the taken path of a conditional branch instruction can be based on a program history that is stored in a private branch prediction memory (e.g., a private branch prediction table) in the instruction pipeline and that can include the branch prediction history of previously executed conditional branch instructions. When the conditional branch instruction finally reaches the execution stage of the instruction pipeline and is executed, the resultant target address of the conditional branch instruction is verified by comparing it with the previously predicted target address when the conditional branch instruction was fetched. If the predicted and actual target addresses match, meaning a correct prediction was made, delay is not incurred in instruction execution, because the subsequent instructions at the target address will have been correctly fetched and already be present in the instruction pipeline when the conditional branch instruction reaches an execution stage of the instruction pipeline. Power consumption is also reduced by the processor not having to stall processing instructions that follow the conditional branch instruction until the conditional branch instruction is executed. Thus, performance and power consumption can be improved by employing accurate branch prediction in a processor. However, if the predicted and actual target addresses do not match, a mispredicted branch hazard occurs in the instruction pipeline that causes a precise interrupt. As a result, a misprediction recovery process is performed, whereby the instruction pipeline is flushed and the instruction pipeline fetch unit is redirected to fetch new instructions starting from the target address, resulting in delay and reduced performance. Misprediction in the processing of instructions in a processor is costly in terms of the resulting delay and reduced performance. Thus, the more accurate a branch prediction, the greater performance and power consumption savings can be realized and offset any reduced performance and power consumption that occurs in misprediction recoveries.

Generally, a branch predictor with a larger capacity branch prediction table is more accurate, because the branch predictor can store more program history to make branch predictions. However, design and performance constraints of the processor, such as cycle times and area constraints, may limit the size of the branch prediction table of a branch predictor. One method to scale up the memory size of a branch prediction table without having to allocate additional storage in the branch predictor in the instruction pipeline is to allocate additional memory for storing branch prediction history in a separate, shared, lower level memory outside the fetch stage of the instruction pipeline. For example, larger branch prediction memory can be allocated in a main memory or a lower level cache memory that serves the processor. The smaller branch prediction table in the instruction pipeline can function as a cache of the branch prediction memory. The branch prediction memory is shared between different contexts for processes (e.g., a thread) executing in the processor for storing and access branch prediction history. Branch prediction states can be swapped in and out between a smaller branch prediction table in the branch predictor in the instruction pipeline and the branch prediction memory like a cache memory. Thus, the effective capacity of a branch prediction table in a branch predictor in an instruction pipeline can be increased to increase branch prediction accuracy without having to increase the branch prediction table in the branch predictor.

However, providing the larger capacity shared branch prediction memory can be a source of leaked information about an application executing in the processor, thus subjecting the application to a security vulnerability. For example, a malicious attacker application executing in the processor can prime the branch predictor to put the branch prediction history in a predefined state. Thus later, when a victim application is executed, the predefined branch prediction history states primed by the attacker application in the shared branch prediction memory will be cached into the branch prediction table of the branch predictor and influence the speculative execution paths of the victim application. The victim application will cause some of the branch prediction entries in the branch prediction table to be updated and/or evicted into the shared branch prediction memory. Thus, when the attacker application resumes execution, it can access the shared branch prediction memory to detect the change in branch prediction states as a result of the victim application execution and extract this information about the victim application. Branch prediction could be disabled to avoid such a security vulnerability, but this defeats the performance benefits of branch prediction. An alternative solution to prevent this security vulnerability could be to flush the branch prediction memory on each context switch, and thus there could be no leakage of branch prediction history updates caused by executed applications. However, this causes the branch predictor to have to be retrained after each context switch and will result in less accurate branch prediction during training.

SUMMARY

Aspects disclosed herein include swapping and restoring context-specific branch predictor states on context switches in a processor. A context is the minimal set of data used by a process of an application ("process") executed in a processor of a central processing unit (CPU) that is saved to allow the task to be interrupted, and later executed from the same interruption point. A context switch stores the state of a context for an interrupted process so that it can be restored and execution of the process resumed in the processor from the same point later. Context switching allows multiple processes to share a single processor. In this regard, the processor includes an instruction processing circuit that includes a number of instruction processing stages configured to pipeline the processing and execution of fetched instructions according to a dataflow execution. The instruction processing circuit includes a fetch circuit in a fetch stage that is configured to fetch instructions from an instruction memory to be inserted in an instruction pipeline to be executed. A branch prediction circuit is configured to speculatively predict the outcome of a fetched branch instruction (e.g., a conditional branch instruction, an indirect branch instruction, a return branch instruction) to be used to determine next instructions to be fetched by the fetch circuit into an instruction pipeline. The branch prediction circuit is configured to access a branch prediction state to speculatively predict the outcome of the branch instruction.

In exemplary aspects disclosed herein, the branch prediction circuit includes a private branch prediction memory (e.g., a branch prediction table circuit) that is configured to store branch prediction states for a context of a current process being executed ("current context") to be used in predicting outcomes of branch instructions in the current context during execution. The private branch prediction memory is only influenced by the current context and not by contexts of other processes that are not currently executing. When a context switch occurs in the processor, branch prediction states stored in the private branch prediction memory and associated with the current, to-be-swapped-out context, are swapped out of the private branch prediction memory to a shared branch prediction memory. The shared branch prediction memory is a shared structure that is configured to store branch prediction states for multiple contexts for multiple running processes. For example, the shared branch prediction memory may be outside of the instruction processing circuit, such as in a cache memory or a main memory associated with the processor. Branch prediction states in the shared branch prediction memory previously stored (i.e., swapped out) and associated with to-be-swapped-in context are restored in the private branch prediction memory to be used for branch prediction during execution of the process associated with the swapped-in context. A further context change again causes the associated branch prediction states in the shared branch prediction memory for the new swapped-in context to be restored in the private branch prediction memory, with the branch prediction states in the private branch prediction memory for the current swapped-out context being stored back in the shared branch prediction memory.

In this manner, the branch prediction history in a current context of a process is retained and not lost when the context is swapped out of the instruction processing circuit and swapped back in for use in execution of its associated process at a later time. The size of the private branch prediction memory can be used exclusively for storing branch prediction states of a current context, effectively enlarging the size of the branch predictor circuit for more accurate branch prediction, as opposed to sharing the private branch prediction memory among multiple different contexts. Also, because the shared branch prediction memory is capable of storing branch prediction states for multiple specific contexts that are shared, flushing of the shared branch prediction memory on context switching is not necessary to avoid leaking of information about a victim process context by an attacker process. Thus, for example, if an attacker process primes branch prediction states in the private branch prediction memory, and then a victim process is later swapped in place of the attacker process for execution, the primed branch prediction states are not used for branch prediction of branch instructions in the victim process. The branch prediction states for the attacker process are swapped out into the shared branch prediction memory, and the previously stored branch prediction states for the victim process are swapped into the private branch prediction memory. Thus, when the attacker process is swapped back in, the previously-primed branch prediction history is restored in the private branch prediction memory in place of the victim process's context branch prediction history without the victim application having been affected by the primed branch prediction states associated with the attacker process. Thus, the attacker process cannot detect by its execution, how the victim process executed based on how the primed branch prediction states were affected by the victim process execution.

In this regard, in one exemplary aspect, a branch prediction circuit is provided. The branch prediction circuit comprises a private branch prediction memory configured to store at least one branch prediction state for a current context of a current process executing in an instruction processing circuit of a processor. The branch prediction circuit is configured to speculatively predict an outcome of a branch instruction in the current process executing in the instruction processing circuit, based on a branch prediction state among the at least one branch prediction state in the current context in the private branch prediction memory associated with the branch instruction. The branch prediction circuit is also configured to receive a process identifier identifying a new context swapped into the instruction processing circuit. In response to the process identifier indicating the new context different from the current context swapped into the instruction processing circuit, the branch prediction circuit is also configured to cause at least one branch prediction state associated with the new context to be stored as the at least one branch prediction state in the private branch prediction memory.

In another exemplary aspect, a method of predicting a branch outcome of a branch instruction for a context executing in an instruction processing circuit of a processor is provided. The method comprises speculatively predicting an outcome of a branch instruction in a current process executing in the instruction processing circuit, based on a branch prediction state among at least one branch prediction state of a current context of the current process in a private branch prediction memory associated with the branch instruction, the private branch prediction memory configured to store at least one branch prediction state for the current context of the current process to be executed in an instruction processing circuit of a processor. The method also comprises receiving a process identifier identifying a new context swapped into the instruction processing circuit. The method also comprises determining if the process identifier indicates a new context different from the current context swapped into the instruction processing circuit. The method also comprises causing at least one branch prediction state associated with the new context to be stored as at least one branch prediction state in the private branch prediction memory, in response to the process identifier indicating the new context different from the current context swapped into the instruction processing circuit.

In another exemplary aspect, a processor-based system is disclosed. The processor-based system comprises a processor. The processor comprises an instruction processing circuit comprising one or more instruction pipelines comprising a fetch circuit, a branch prediction circuit, and an execution circuit. The fetch circuit is configured to fetch a plurality of instructions from a memory into an instruction pipeline among the one or more instruction pipelines to be executed by the execution circuit. The instruction processing circuit also comprises a branch prediction circuit comprising a private branch prediction memory configured to store at least one branch prediction state for a current context to be executed in the instruction processing circuit of the processor. The branch prediction circuit is configured to speculatively predict an outcome of a branch instruction in the current process executing in the instruction processing circuit, based on a branch prediction state among the at least one branch prediction state in the current context in the private branch prediction memory associated with the branch instruction. The instruction processing circuit is configured to receive a process identifier identifying a new context swapped into the instruction processing circuit, and in response to the process identifier indicating the new context different from the current context swapped into the instruction processing circuit, cause at least one branch prediction state associated with the new context to be stored as at least one branch prediction state in the private branch prediction memory. The processor also comprises a shared branch prediction memory configured to store at least one branch prediction state associated with a context among each of a plurality of contexts associated with respective processes configured to be executed in the instruction processing circuit.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a diagram of an exemplary processor-based system that includes a processor with an instruction processing circuit that includes one or more instruction pipelines for processing computer instructions for execution, wherein the instruction processing circuit is configured to retrieve branch prediction states associated with a swapped-in context from a shared branch prediction memory, and swap in and restore the retrieved branch prediction states in a private branch prediction memory for a branch prediction circuit to be used for branch prediction in execution of a process associated with the swapped-in context;

FIG. 2 is a flowchart illustrating an exemplary processing of the instruction processing circuit in FIG. 1;

Figure 1:
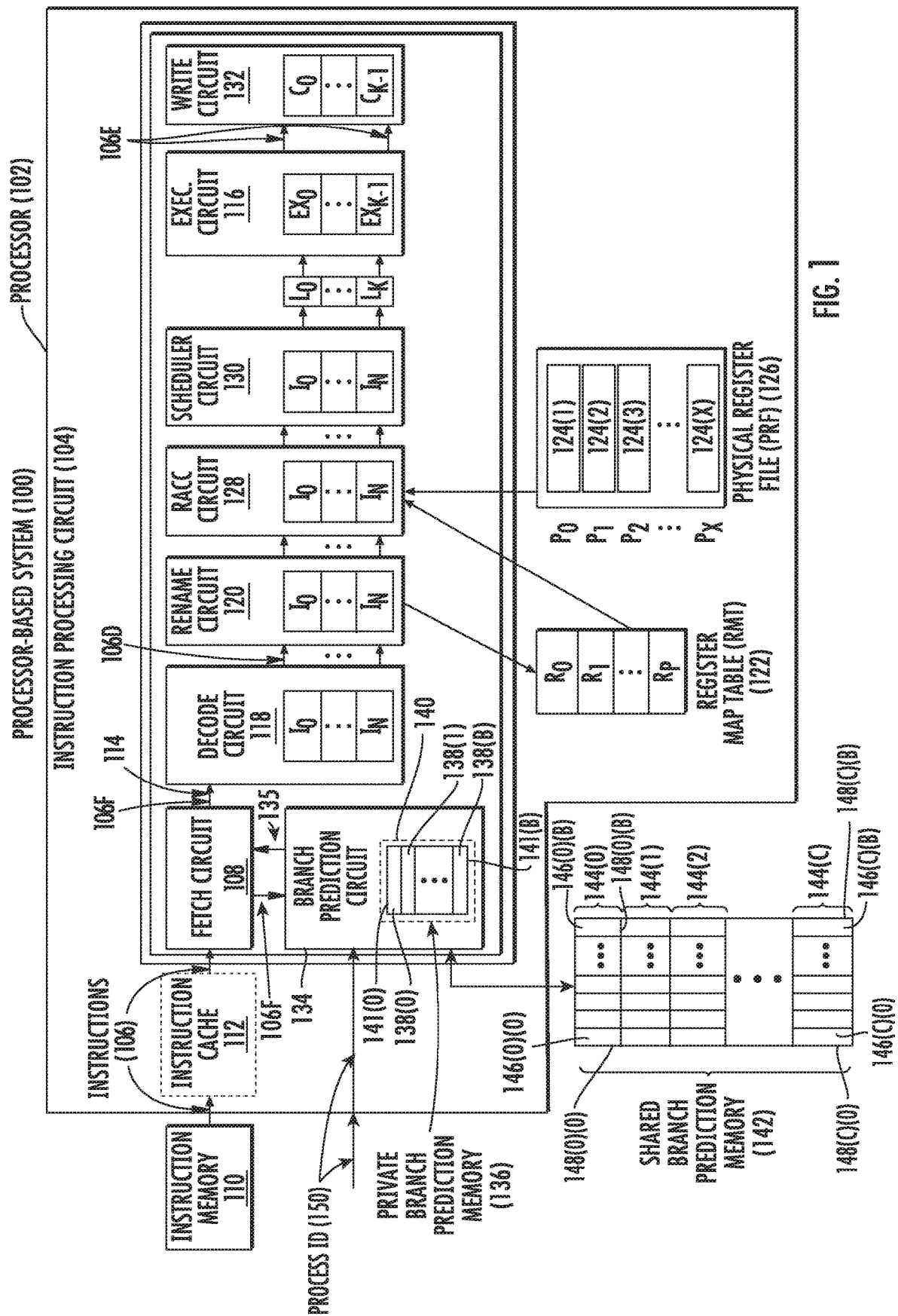
Figure 4:
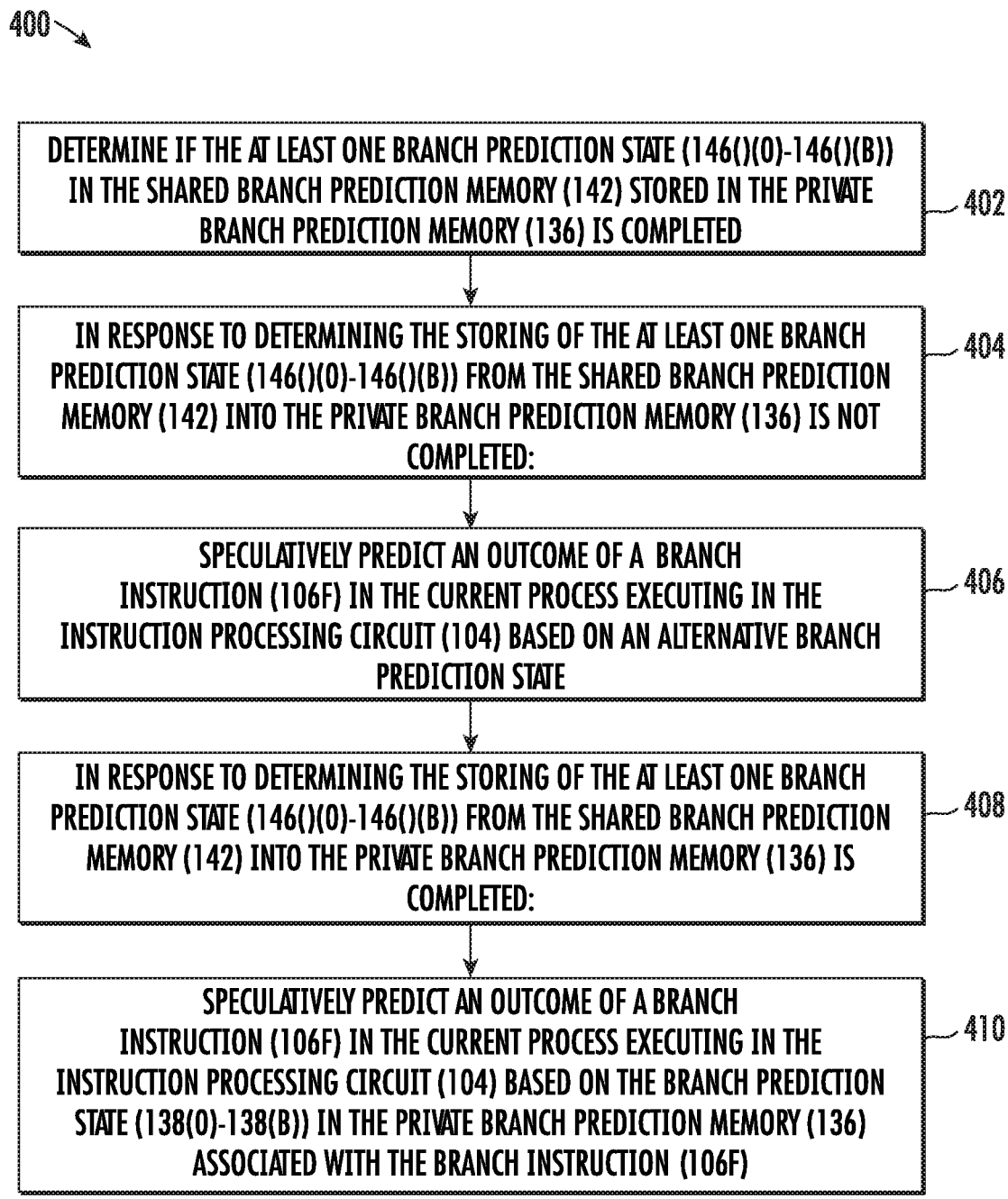
Figure 5:
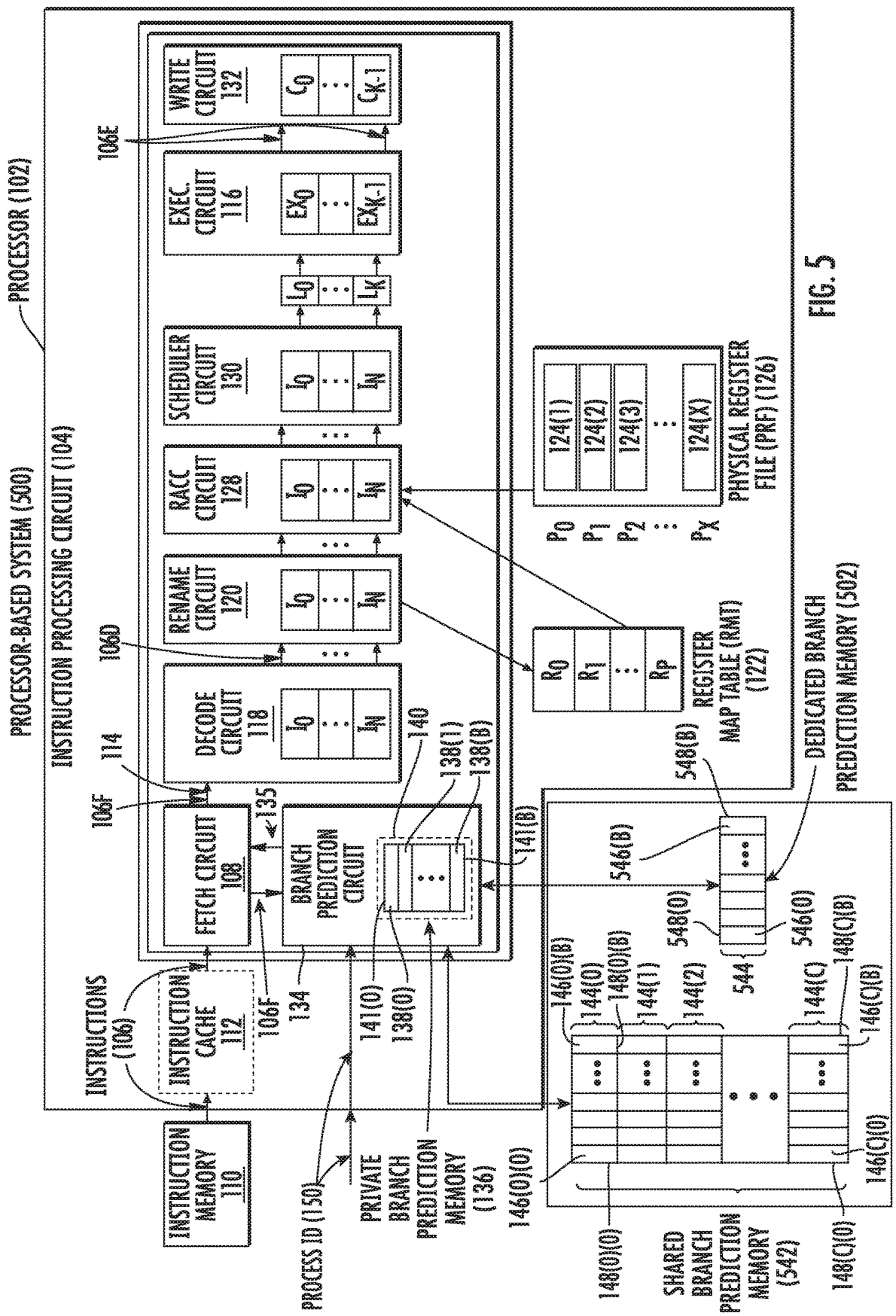
Figure 6:
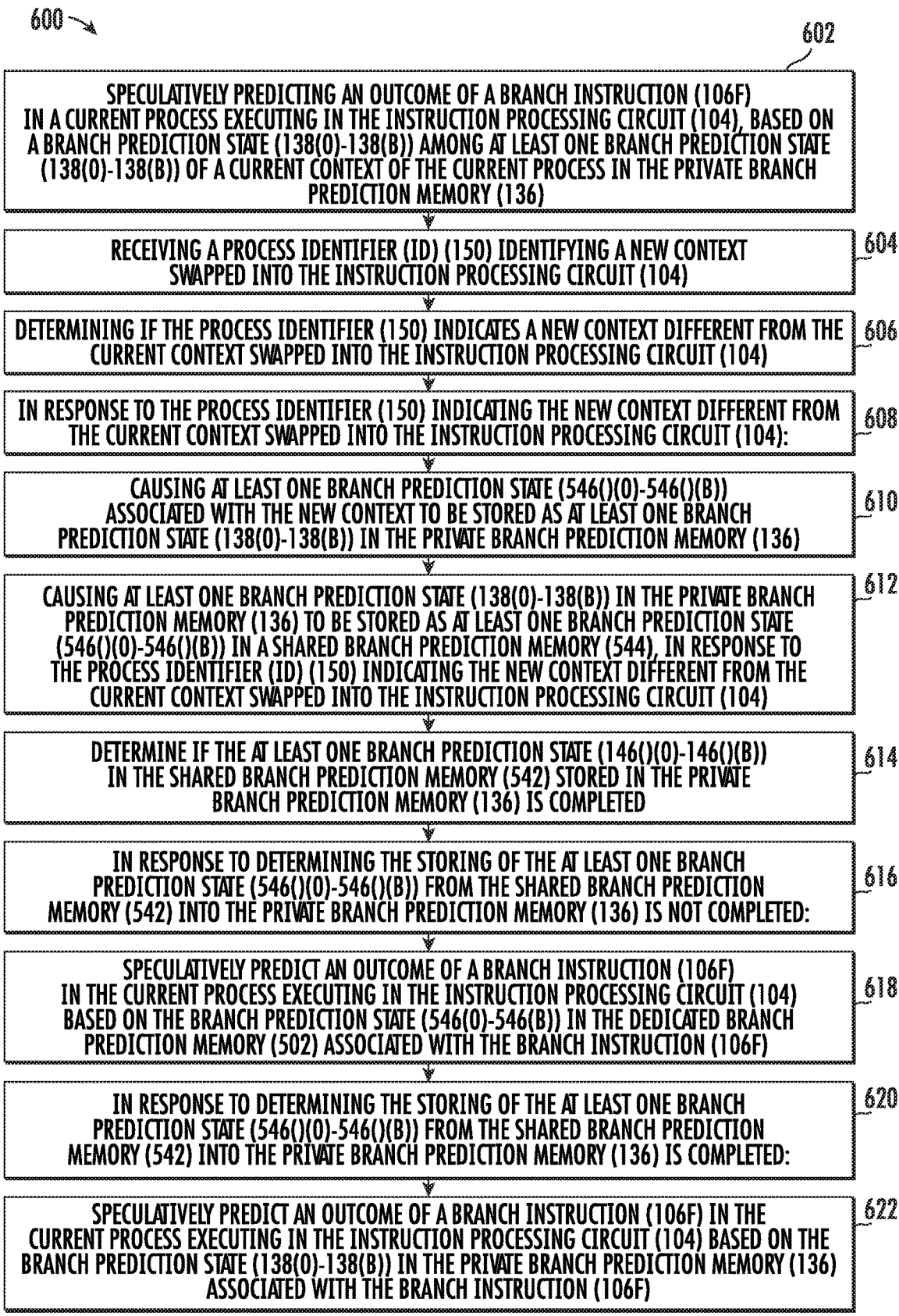
Figure 7:
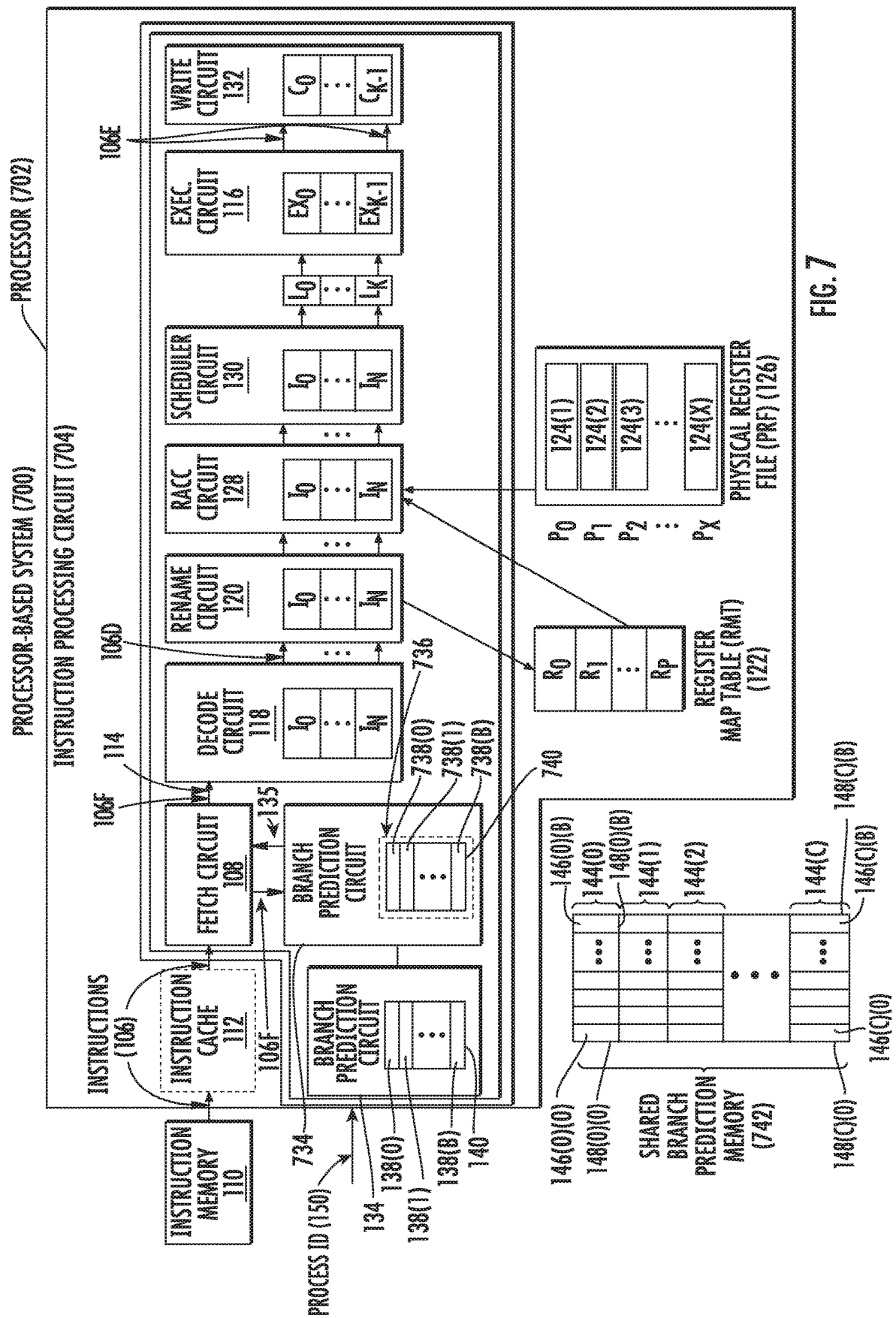
Figure 8A:
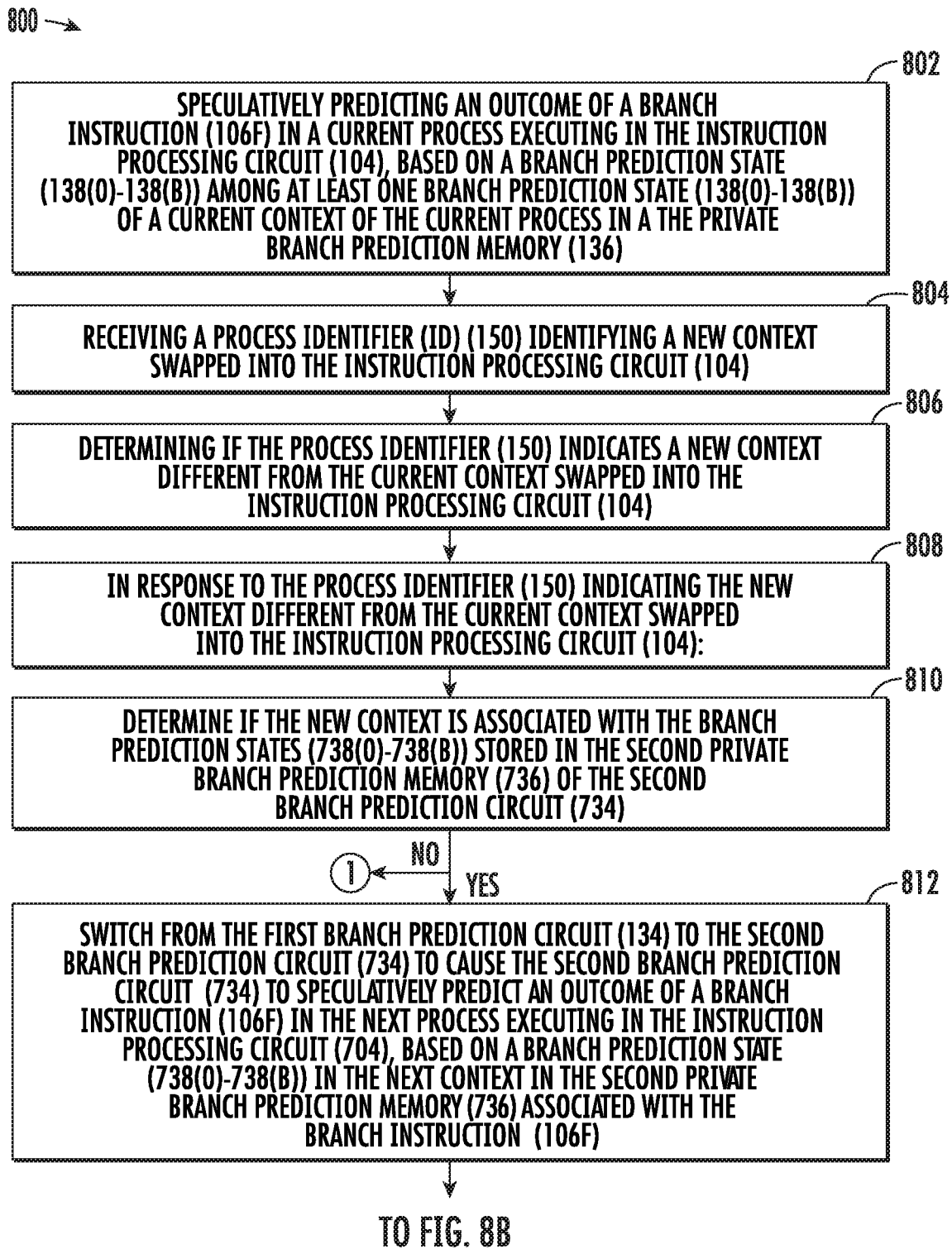
Figure 8B:
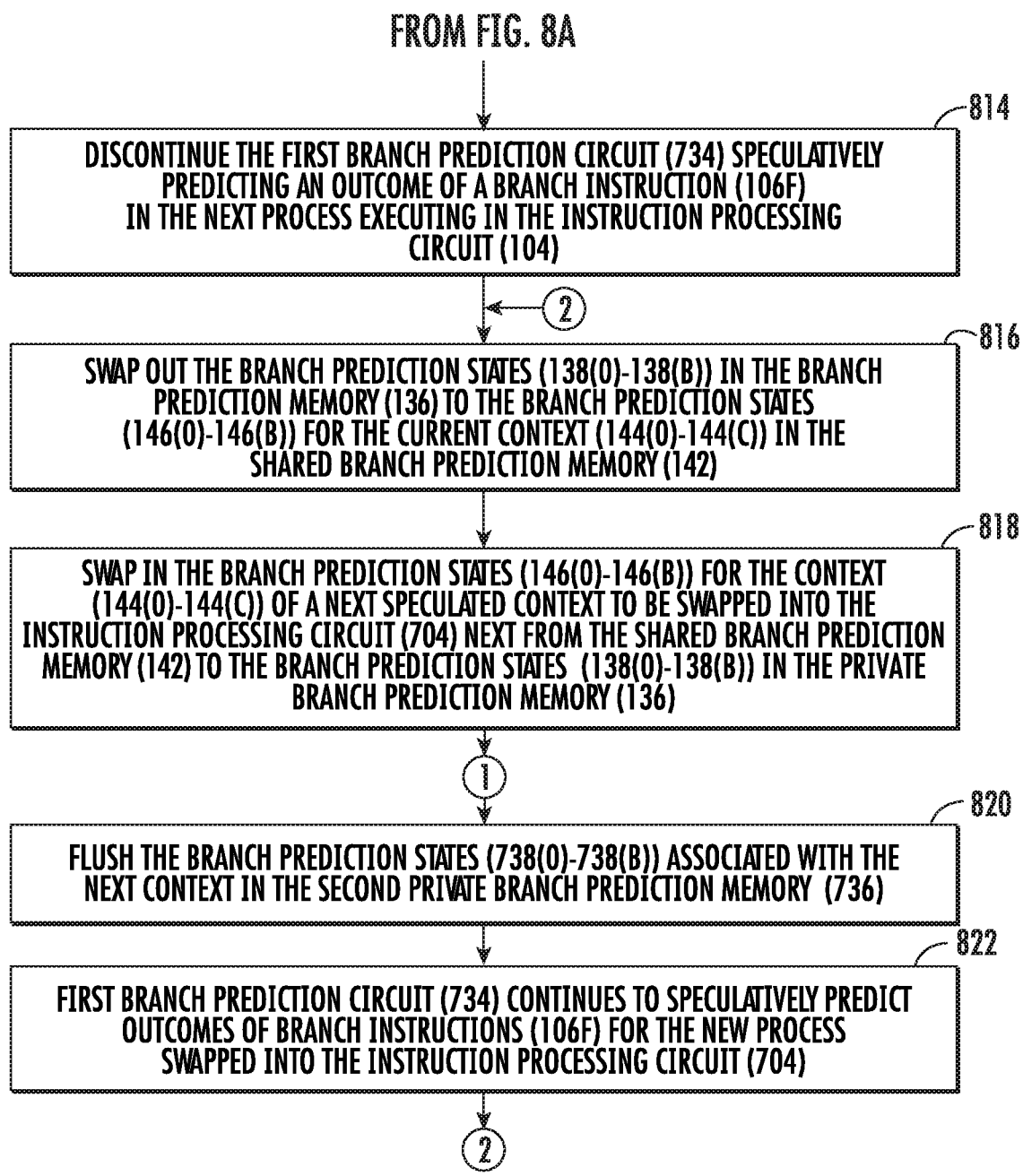
Figure 9:
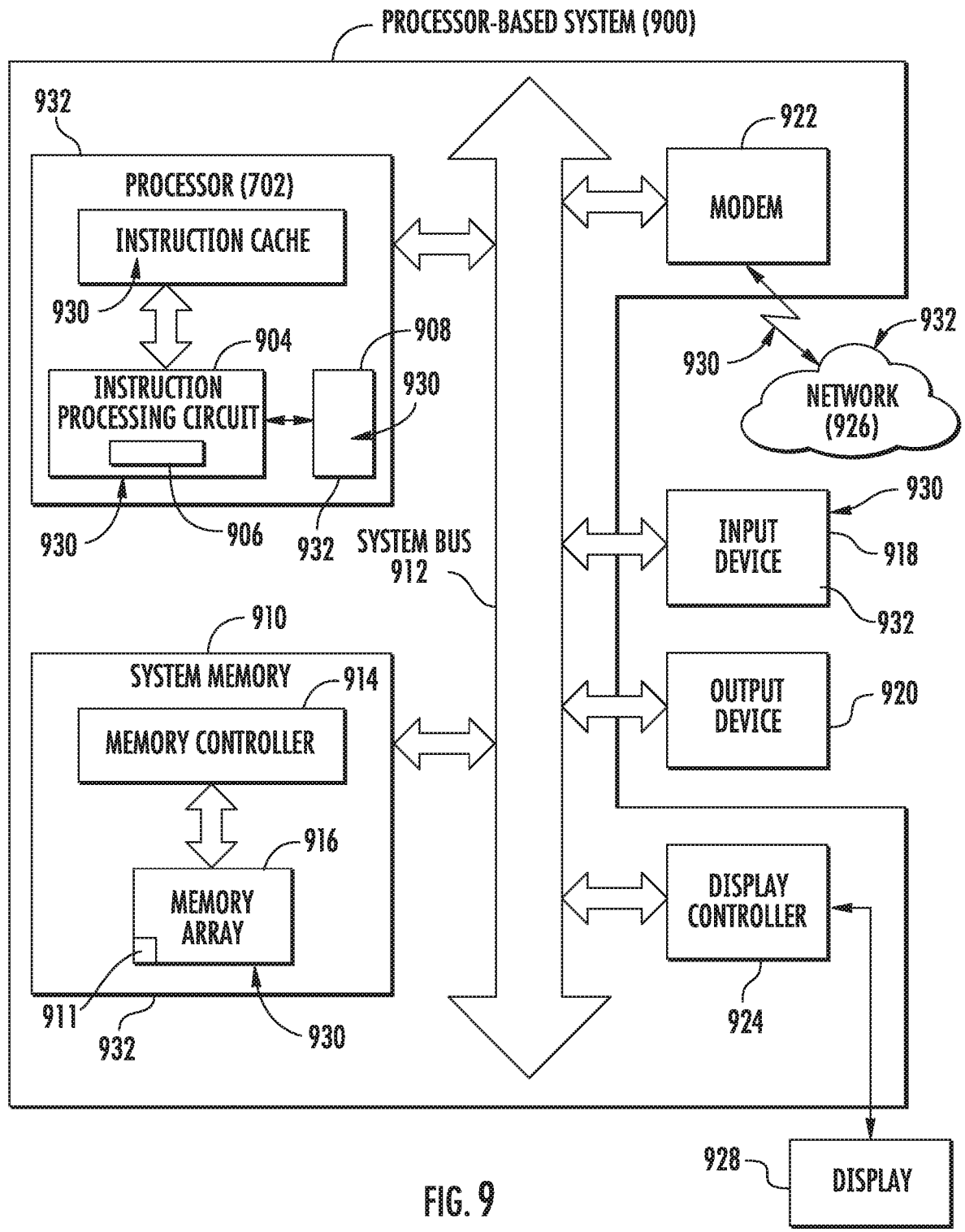

FIG. 4 is a flowchart illustrating an alternative exemplary processing of the instruction processing circuit in FIG. 1, in response to a context switch, partially swapping in and restoring branch prediction states associated with a swapped-in context from a shared branch prediction memory to a private branch prediction memory to be used for branch prediction in execution a process associated with the swapped-in context;

FIG. 5 is a diagram of an alternative exemplary processor-based system that includes an instruction processing circuit configured to, in response to a context switch, temporarily use an alternative branch prediction scheme until the swap-in and restoration of retrieved branch prediction states from a shared branch prediction memory to a private branch prediction memory to be used for branch prediction in executing a process associated with the swapped-in context until the swapping of the swap-in context is completed;

FIG. 6 is a flowchart illustrating an exemplary processing of the instruction processing circuit in FIG. 5;

FIG. 7 is a diagram of another alternative exemplary processor-based system that includes a processor with an instruction processing circuit that includes one or more instruction pipelines for processing computer instructions for execution, wherein the instruction processing circuit includes a primary and secondary branch prediction circuit configured to store respective branch prediction states for a current context and branch prediction states for another next context likely to be swapped in after the current context, wherein the instruction processing circuit is configured to retrieve branch prediction states associated with the next context from a shared branch prediction memory, and swap in and restore the retrieved branch prediction states in a private branch prediction memory of the secondary branch prediction circuit to be ready to use for branch prediction in execution of a process associated with the next context when swapped in for the current context;

FIGS. 8A and 8B are flowcharts illustrating an exemplary processing of the instruction processing circuit in FIG. 7; and FIG. 9 is a block diagram of an exemplary processor-based system that includes a processor with an instruction processing circuit that includes a branch prediction circuit for predicting outcomes of branch instructions, wherein the instruction processing circuit is configured to retrieve branch prediction states associated with a swapped-in context from a shared branch prediction memory, and swap in and restore the retrieved branch prediction states in a private branch prediction memory for a branch prediction circuit to be used for branch prediction in execution of the swapped-in context, including but not limited to the instruction processing circuits in FIGS. 1, 5, and 7.

DETAILED DESCRIPTION

Aspects disclosed herein include swapping and restoring context-specific branch predictor states on context switches in a processor. A context is the minimal set of data used by a process of an application ("process") executed in a processor of a central processing unit (CPU) that is saved to allow the task to be interrupted, and later executed from the same interruption point. A context switch stores the state of a context for an interrupted process so that it can be restored and execution of the process resumed in the processor from the same point later. Context switching allows multiple processes to share a single processor. In this regard, the processor includes an instruction processing circuit that includes a number of instruction processing stages configured to pipeline the processing and execution of fetched instructions according to a dataflow execution. The instruction processing circuit includes a fetch circuit in a fetch stage that is configured to fetch instructions from an instruction memory to be inserted in an instruction pipeline to be executed. A branch prediction circuit is configured to speculatively predict the outcome of a fetched branch instruction (e.g., a conditional branch instruction, an indirect branch instruction, a return branch instruction) to be used to determine the next instructions to be fetched by the fetch circuit into an instruction pipeline. The branch prediction circuit is configured to access a branch prediction state to speculatively predict the outcome of the branch instruction.

In exemplary aspects disclosed herein, the branch prediction circuit includes a private branch prediction memory (e.g., a branch prediction table circuit) that is configured to store branch prediction states for a context of a current process being executed ("current context") to be used in predicting outcomes of branch instructions in the current context during execution. The private branch prediction memory is only influenced by the current context and not by contexts of other processes that are not currently executing. When a context switch occurs in the processor, branch prediction states stored in the private branch prediction memory and associated with the current, to-be-swapped-out context, are swapped out of the private branch prediction memory to a shared branch prediction memory. The shared branch prediction memory is a shared structure that is configured to store branch prediction states for multiple contexts for multiple running processes. For example, the shared branch prediction memory may be outside of the instruction processing circuit, such as in a cache memory or a main memory associated with the processor. Branch prediction states in the shared branch prediction memory previously stored (i.e., swapped out) and associated with to-be-swapped-in context are restored in the private branch prediction memory to be used for branch prediction during execution of the process associated with the swapped-in context. A further context change again causes the associated branch prediction states in the shared branch prediction memory for the new swapped-in context to be restored in the private branch prediction memory, with the branch prediction states in the private branch prediction memory for the current swapped-out context being stored back in the shared branch prediction memory.

In this manner, the branch prediction history in a current context of a process is retained and not lost when the context is swapped out of the instruction processing circuit and swapped back in for use in execution of its associated process at a later time. The size of the private branch prediction memory can be used exclusively for storing branch prediction states of a current context, effectively enlarging the size of the branch predictor circuit for more accurate branch prediction, as opposed to sharing the private branch prediction memory among multiple different contexts. Also, because the shared branch prediction memory is capable of storing branch prediction states for multiple specific contexts that are shared, flushing of the shared branch prediction memory on context switching is not necessary to avoid leaking of information about a victim process context by an attacker process. Thus, for example, if an attacker process primes branch prediction states in the private branch prediction memory, and then a victim process is later swapped in place of the attacker process for execution, the primed branch prediction states are not used for branch prediction of branch instructions in the victim process. The branch prediction states for the attacker process are swapped out into the shared branch prediction memory, and the previously stored branch prediction states for the victim process are swapped into the private branch prediction memory. Thus, when the attacker process is swapped back in, the previously-primed branch prediction history is restored in the private branch prediction memory in place of the victim process's branch prediction history without the victim process having been affected by the primed branch prediction states associated with the attacker process. Thus, the attacker process cannot detect by its execution how the victim process executed based on how the primed branch prediction states were affected by the victim process execution.

In this regard, FIG. 1 is a diagram of an exemplary processor-based system 100 that includes a processor 102. The processor 102 may be an in-order or an out-of-order processor (OoP). The processor 102 may also be referred to as a "processor core" or a "central processing unit (CPU) core." The processor-based system 100 may include a plurality of the processors 102. In this example, the processor 102 includes an instruction processing circuit 104 that includes one or more instruction pipelines $I_0$-$I_N$ for processing fetched computer instructions 106F fetched by a fetch circuit 108 for execution. The fetch circuit 108 is configured to fetch instructions 106 from an instruction memory 110. The instruction memory 110 may be provided in or as part of a system memory in the processor-based system 100 as an example. An instruction cache 112 may also be provided in the processor 102 to cache the instructions 106 fetched from the instruction memory 110 to reduce latency in the fetch circuit 108. The fetch circuit 108 in this example is configured to provide the instructions 106 as fetched instructions 106F into the one or more instruction pipelines $I_0$-$I_N$ as an instruction stream 114 in the instruction processing circuit 104 to be pre-processed, before the fetched instructions 106F reach an execution circuit 116 to be executed. The fetched instructions 106F in the instruction stream 114 include producer instructions and consumer instructions that consume produced values as a result of the instruction processing circuit 104 executing producer instructions. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 116.

With continuing reference to FIG. 1, the instruction processing circuit 104 includes a decode circuit 118 configured to decode the fetched instructions 106F fetched by the fetch circuit 108 into decoded instructions 106D to determine the instruction type and actions required. The instruction type and action required encoded in the decoded instruction 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 120 in the instruction processing circuit 104. The rename circuit 120 is configured to determine if any register names in the decoded instructions 106D need to be renamed to break any register dependencies that would prevent parallel or out-of-order processing. The rename circuit 120 is configured to call upon a register map table (RMT) 122 to rename a logical source register operand and/or write a destination register operand of a decoded instruction 106D to available physical registers 124(1)-124(X) ($P_0$, $P_1$, . . . , $P_X$) in a physical register file (PRF) 126. The RMT 122 contains a plurality of mapping entries each mapped to (i.e., associated with) a respective logical register $R_0$-R. The mapping entries are configured to store information in the form of an address pointer to point to a physical register 124(1)-124(X) in the physical register file (PRF) 126. Each physical register 124(1)-124(X) in the PRF 126 contains a data entry configured to store data for the source and/or destination register operand of a decoded instruction 106D.

The instruction processing circuit 104 in the processor 102 in FIG. 1 also includes a register access (RACC) circuit 128. The register access circuit 128 is configured to access a physical register 124(1)-124(X) in the PRF 124 based on a mapping entry mapped to a logical register $R_0$-$R_P$ in the RMT 122 of a source register operand of a decoded instruction 106D to retrieve a produced value from an executed instruction 106E in the execution circuit 116. The register access circuit 128 is also configured to provide the retrieved produced value from an executed decoded instruction 106E as the source register operand of a decoded instruction 106D to be executed. Also, in the instruction processing circuit 104, a scheduler circuit 130 is provided in the instruction pipeline $I_0$-$I_N$ and is configured to store decoded instructions 106D in reservation entries until all source register operands for the decoded instruction 106D are available. For example, the scheduler circuit 130 is responsible for determining that the necessary values for operands of a decoded consumer instruction 106D are available before issuing the decoded consumer instruction 106D in an issue lane $L_0$-$L_{K-1}$ among 'K' issue lanes to the execution circuit 116 for execution. The scheduler circuit 130 issues decoded instructions 106D ready to be executed to the execution circuit 116. A write circuit 132 is also provided in the instruction processing circuit 104 to write back or commit produced values from executed instructions 106E to memory, such as the PRF 126, cache memory, or system memory.

With continuing reference to FIG. 1, the instruction processing circuit 104 also includes a branch prediction circuit 134. The branch prediction circuit 134 is configured to speculatively predict the outcome of a fetched branch instruction 106F that controls whether the taken or not taken path in the instruction control flow path of the instruction stream 114 is fetched into the instruction pipelines $I_0$-$I_N$ for execution. For example, the branch instruction 106F may be a conditional branch instruction that includes a condition to be resolved by the instruction processing circuit 104 to determine which control flow path in the instruction stream 114 should be taken. In this manner, the outcome of the fetched branch instruction 106F, as a conditional branch instruction in this example. does not have to be resolved in execution by the execution circuit 116 before the instruction processing circuit 104 can continue processing fetched instructions 106F. The prediction made by the branch prediction circuit 134 can be provided as prediction information 135 by the fetch circuit 108 to be used by the fetch circuit 108 to determine the next instructions 106 to fetch as the fetched instructions 106F. Other examples of branch instructions 106F that can be fetched include indirect branch instructions and return branch instructions. In this example, the branch prediction circuit 134 makes a speculative prediction for a branch instruction 106F based on a branch prediction state stored in a private branch prediction memory 136. As will be discussed in more detail below, the private branch prediction memory 136 is only influenced by the context of a current process being executed in the instruction processing circuit 104 and not by contexts of other processes that are not currently executing.

The private branch prediction memory 136 is configured to store branch prediction states 138(0)-138(B), which in this example is 'B+1' branch prediction states. For example, the private branch prediction memory 136 may be a branch prediction table circuit 140 that contains a plurality of indexable entries 141(0)-141(B) configured to store a corresponding branch prediction state 138(0)-138(B). The branch prediction circuit 134 is configured to speculatively predict the outcome of a fetched branch instruction 106F based on a retrieved branch prediction state 138(0)-138(B) from the private branch prediction memory 136 to determine next instructions 106 to be fetched by the fetch circuit 108 into the instruction pipeline $I_0$-$I_N$. For example, if a prediction of an outcome for a branch instruction 106F made by the branch prediction circuit 134 is that branch instruction 106F will resolve to a taken instruction flow path, the branch prediction circuit 134 can provide this prediction information 135 to the fetch circuit 108 to cause the fetch circuit 108 to fetch instructions 106 from the taken instruction flow path into the instruction pipeline(s) $I_0$-$I_N$. However, if the prediction made by the branch prediction circuit 134 is that the branch instruction 106F will resolve to a taken instruction flow path, the branch prediction circuit 134 can also provide this prediction information 135 to the fetch circuit 108 to cause the fetch circuit 108 to fetch instructions 106 from the taken instruction flow path into the instruction pipelines(s) $I_0$-$I_N$. If the prediction is determined to have been a misprediction once the branch instruction 106F is executed in the execution circuit 116 to resolve the condition, instructions 106 fetched into the instruction processing circuit 104 from the incorrect instruction flow path can be flushed and instructions 106 from the correct instruction flow path can be fetched.

As an example, the branch prediction states 138(0)-138(B) may include a bit that uses logic state '0' to signify a not taken branch state, and logic state '1' to signify a taken branch state. The branch prediction table circuit 134 may be configured to store static states as the branch prediction states 138(0)-138(B) in the branch prediction table circuit 140 that are not dynamically changed based on the execution of instructions 106F. Alternatively, the branch prediction circuit 134 may be configured to update the branch prediction states 138(0)-138(B) in the branch prediction circuit 140 based on a history of the execution of instructions 106F. For example, a branch prediction state 138(0)-138(B) may be updated based on a history of resolved conditions of branch instructions 106F executed in the execution circuit 116. Thus, a larger number of branch prediction states 138(0)-138(B) allows more specific history information regarding branch instructions to be stored, thus increasing branch prediction accuracy.

The processor 102 in FIG. 1 may be a multi-tasking processor that is capable of swapping in and out running processes (e.g., a thread) to be executed in the instruction processing circuit 104. Context information, referred to as "context," is information used and updated by the instruction processing circuit 104 during the execution of a process. For example, context may include the data stored in the RMT 122 and/or the PRF 126, the state of flags, and branch prediction states 138(0)-138(B) stored in the branch prediction table circuit 140 as a process is executed in the instruction processing circuit 104. A context in the processor 102 is the minimal set of data used by a process executed in the processor 102 that is saved to allow the task to be interrupted, and later executed from the same interruption point. Thus, when a new, next process is swapped into the instruction processing circuit 104 to be executed in place of a currently executing process, a context switch is performed by the processor 102. Context switching allows multiple processes to share the processor 102. A context switch is a processor storing the context for an interrupted current process that is to be swapped out of the instruction processing circuit 104 in favor of a new, next process so that the context can be restored and execution of the previous current process resumed in the processor 102 from the same point of interruption. Thus, a context switch involves restoring the context of the next process swapped into the instruction processing circuit 104 to be executed as well as swapping in the next process itself.

In this example of the processor 102 in FIG. 1, it is desired to size the private branch prediction memory 136 of the branch prediction circuit 134 to store the desired number of branch prediction states 138(0)-138(B) to provide the desired level of prediction accuracy, but within design and performance constraints of the processor 102. For example, the processor 102 may be constrained by cycle times and area constraints that may limit the size of the private branch prediction memory 136 in the in the branch prediction circuit 134. One method to scale up the memory size of the private branch prediction memory 136 to increase branch prediction accuracy without having to increase storage in the branch prediction circuit 134 is to allocate additional memory for storing branch prediction states in a separate, shared memory. In this regard, as shown in FIG. 1, the processor-based system 100 includes a shared branch prediction memory 142. In this example, the shared branch prediction memory 142 is outside the branch prediction circuit 134 so as to not consume area in the branch prediction circuit 134 and/or its private branch prediction memory 136. The shared branch prediction memory 142 may be provided outside the instruction processing circuit 104. For example, the shared branch prediction memory 142 may be provided in a cache memory, including but not limited to inside the processor 102 (e.g., an L1 cache), a cache outside the processor 102 (e.g., an L3 cache), or main memory (e.g., a double data rate random access memory (RAM) (DDRAM)) of the processor-based system 100. The shared branch prediction memory 142 is sized to store multiple contexts 144(0)-144(C) for different processes that have executed in the processor 102 and may be swapped in to the instruction processing circuit 104 to be further executed. Each context 144(0)-144(C) is configured to store a plurality of branch prediction states 146(0)(0)-146(C)(B) in a corresponding plurality of entries 148, where 'S' may be equal to 'B' for the capacity of branch prediction states 138(0)-138(B) in the private branch prediction memory 136.

In this example, the instruction processing circuit 104 receives a process identification (ID) 150 identifying a new context for a new process swapped into the instruction processing circuit 104 for execution when a process swap occurs. As examples, by the process ID 150 identifying a next context to be swapped into the instruction processing circuit 104, the process ID 150 identifies a process that can be associated to its context or the process ID 150 can be used to identify the context. For example, an operating system (OS) executing in the processor 102 may control process swaps and cause the process ID 150 to be generated. The process ID 150 is indicative of a process swap if the process ID is different from the process currently executing in the instruction processing circuit 104. In this example, when a context switch occurs in the processor 102 in response to the process ID 150 indicating the new swapped in process different from the current process executing in the instruction processing circuit 104, the instruction processing circuit 104 is configured to swap in the branch prediction states 146( )(0)-146( )(B) from the shared branch prediction memory 142 for the context associated with the swapped-in process to be executed, to the private branch prediction memory 136. Likewise, to preserve the current branch prediction states 138(0)-138(B) in the private branch prediction memory 136 for the swapped-out process, the instruction processing circuit 104 is configured to first swap out the branch prediction states 138(0)-138(B) from the private branch prediction memory 136 to its reserved context 144(0)-144(C) in the shared branch prediction memory 142. In this manner, the branch prediction circuit 134 will use the restored branch condition states 146( )(0)-146( )(B) for the new process swapped in for execution to speculatively predict branch instructions 106F. However, the previous branch condition states 138(0)-138(B) for the swapped-out process are not lost, but rather stored in its reserved context 144(0)-144(C) in the shared branch prediction memory 142. If the swapped-out process is again swapped into the instruction processing circuit 104, the stored branch condition states 146( )(0)-146( )(B) for the previously swapped-out process can be swapped back in as the current branch prediction states 138(0)-138(B) in the private branch prediction memory 136 to be used by the branch prediction circuit 134 in its execution. This is opposed to flushing the branch prediction states 138(0)-138(B) in the private branch prediction memory 136 that would delete the branch prediction history for the swapped-in context and cause the branch prediction circuit 134 to retrain the branch prediction for the swapped-in process through updating of the flushed private branch prediction memory 136.

In this manner, size of the private branch prediction memory 136 can be used exclusively for storing branch prediction states 138(0)-138(B) of a current context for a currently executing process effectively enlarging the size of the branch predictor circuit 134 for more accurate branch prediction, as opposed to sharing the private branch prediction memory 136 among multiple different contexts. Also, because the shared branch prediction memory 142 is capable of storing branch prediction states 146(0)(0)-146(C)(B) for multiple specific contexts 144(0)-144(C) that are shared, flushing of the shared branch prediction memory 142 on context switching is not necessary to avoid leaking of information about a victim process by an attacker process. Thus, for example, if an attacker process primes the branch prediction states 138(0)-138(B) in the private branch prediction memory 136, and then a victim process is later swapped into the instruction processing circuit 104 in place of the attacker process for execution, the primed branch prediction states 138(0)-138(B) are not used for branch prediction of branch instructions in the victim process. The branch prediction states 138(0)-138(B) for the attacker process are swapped out into the shared branch prediction memory 142, and the previously stored branch prediction states 146(0)(0)-146(C)(B) of the specific context 144(0)-144(C) of the victim process are swapped back into the private branch prediction memory 136. Thus, when the attacker process is swapped back in, the previously primed branch prediction history 138(0)-138(B) is restored in the private branch prediction memory 136 in place of the victim process's branch prediction states without the victim process having been affected by the primed branch prediction states 138(0)-138(B) associated with the attacker process. Thus, the attacker process cannot detect by its execution, how the victim process executed based on how its primed branch prediction states 138(0)-138(B) were affected by the victim process execution.

FIG. 2 is a flowchart illustrating an exemplary process 200 of the branch prediction circuit 134 in the instruction processing circuit 104 in FIG. 1 configured to swap in a context from the shared branch prediction memory 142 to the private branch prediction memory 136 in place of a swapped-out context from the private branch prediction memory 136 to the shared branch prediction memory 142. This process 200 in FIG. 2 is discussed below in conjunction with the instruction processing circuit 104 in FIG. 1. In this regard, the branch prediction circuit 134 speculatively predicts an outcome of a branch instruction 106F in a current process executing in the instruction processing circuit 104 (block 202 in FIG. 2). The speculative prediction is based on an accessed associated branch prediction state 138(0)-138(B) in the private branch prediction memory 136 for a context associated with the branch instruction 106F of the current process executing in the instruction processing circuit 104 (block 202 in FIG. 2). As discussed previously, the private branch prediction memory 136 is configured to store branch prediction states 138(0)-138(B) for the current context of the current process being executed in the instruction processing circuit 104 of the processor 102.

With continuing reference to FIG. 2, the branch prediction circuit 134 receives the process ID 150 identifying a new context swapped or to be swapped into the instruction processing circuit 104 signifying a context switch (block 204 in FIG. 2). The branch prediction circuit 134 determines if the process ID 150 indicates a new context different from the current context swapped into the instruction processing circuit 104 (block 206 in FIG. 2). In response to the process ID 150 indicating the new context different from the current context swapped into the instruction processing circuit 104 (block 208 in FIG. 2), the branch prediction circuit 134 causes the branch prediction state 146( )(0)-146( )(B) associated with the new context 144(0)-144(C) to be stored in the branch prediction states 138(0)-138(B) in the private branch prediction memory 136 (block 210). Also, in response to the process ID 150 indicating the new context different from the current context swapped into the instruction processing circuit 104, the branch prediction circuit 134 causes the branch prediction states 138(0)-138(B) in the private branch prediction memory 136 for the current context to be swapped out to be stored as the branch prediction states 146( )(0)-146( )(B) of its context 144(0)-144(C) in the shared branch prediction memory 142 (block 212 in FIG. 2).

Figure 3:
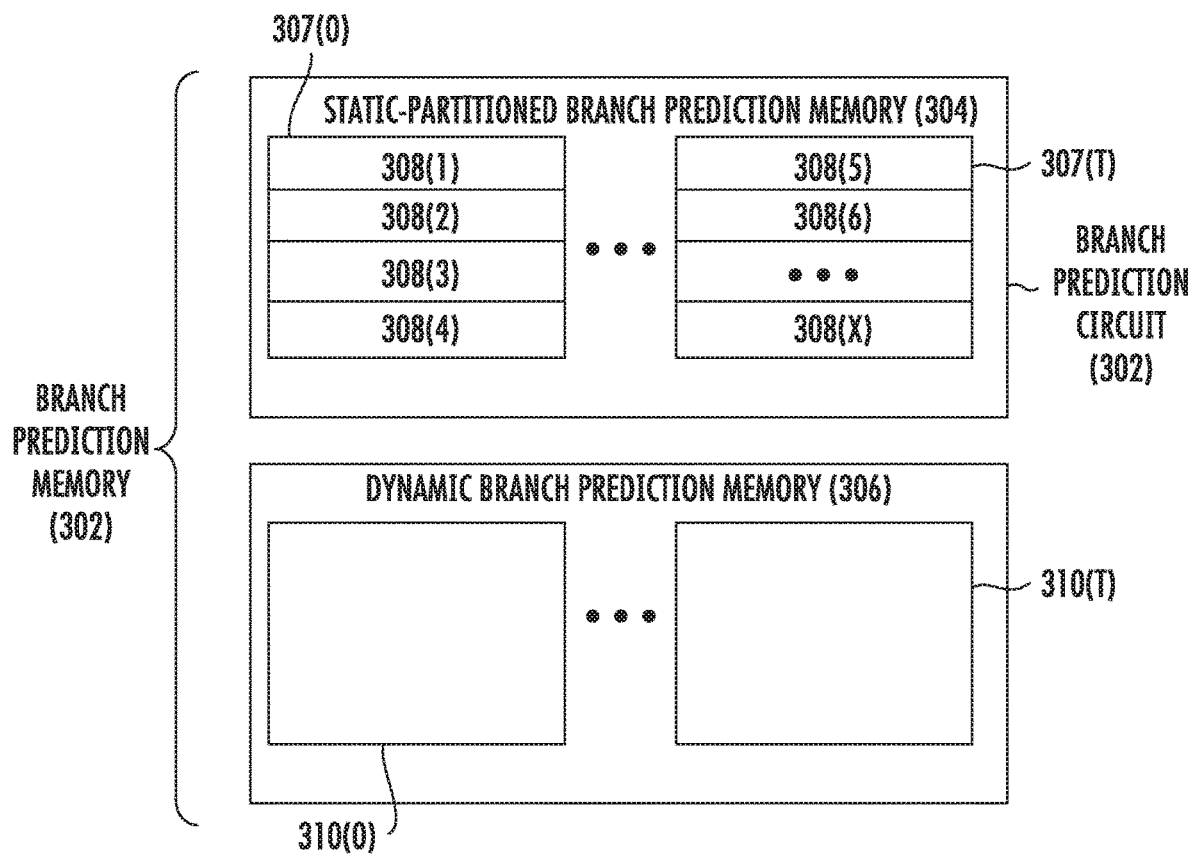
FIG. 3 is a diagram illustrating a branch prediction memory that includes statically partitioned memory configured to store branch prediction states by context and non-partitioned memory configured to store branch prediction states for a current context of a currently executing process.

In this manner, as discussed above, the branch prediction circuit 134 is able to access branch prediction states 138(0)-138(B) in the private branch prediction memory 136 for the context of the currently executing process without the branch prediction states for the process having to be retrained. Also, the shared branch prediction memory 142 does not have to be flushed after context switches as the shared branch prediction memory 142 is sized to store branch prediction states 146(0)(0)-146(C)(B) for specific, different contexts so that a process cannot influence the context and associated branch prediction states of another process. FIG. 3 is a diagram illustrating a branch prediction memory 302 for storing branch prediction states to be used for branch prediction by a branch prediction circuit 300 for comparison purposes. The branch prediction memory 302 is divided into two categories of memory—a static-partitioned branch prediction memory 304 and a dynamic branch prediction memory 306. The static-partitioned branch prediction memory 304 may be local to the branch prediction circuit 300, and the dynamic branch prediction memory 306 may be stored in a separate memory. The static-partitioned branch prediction memory 304 includes one or more branch prediction tables 307(0)-307(T) that are partitioned into memory segments 308(1)-308(X) so that there is isolation between contexts of running processes to avoid one process affecting another process's context for security reasons, as discussed above. The dynamic branch prediction memory 306 includes one or more branch prediction tables 310(0)-310(T) that are not partitioned and are and can be used to store and update prediction states for a currently executing process to provide additional branch prediction state capacity over the static-partitioned branch prediction memory 304. However, the dynamic branch prediction memory 306 is not partitioned and is flushed on context switches to prevent leakage. The static-partitioned branch prediction memory 304 prevents leakage by being partitioned by context, but is a smaller capacity memory structure that has reduced prediction accuracy without use of the dynamic branch prediction memory 306. However, the dynamic branch prediction memory 306 being flushed on context switches causes the branch prediction training (i.e., history) for a context of a swapped-out process to be lost.

With reference back to FIG. 1, the instruction processing circuit 104 and branch prediction circuit 134 can be configured, in response to a context switch, to swap out each of the branch prediction states 138(0)-138(B) in the private branch prediction memory 136 to the shared branch prediction memory 142, and swap in each of the branch prediction states 146( )(0)-146( )(B) for a swapped-in context from the shared branch prediction memory 142 to the private branch prediction memory 136 before making speculative predictions about branch instructions 106F. However, this may delay instruction processing as a swap-in procedure of the new context into the private branch prediction memory 136 may not be completed before a branch instruction 106F is fetched for the process associated with the context. In this regard, a "lazy" swapping procedure may be employed to be able to speculatively predict outcomes of branch instructions 106F before the swap-in of the new context is completed so as to not delay processing branch instructions 106F that may follow a context switch.

For example, FIG. 4 is a flowchart illustrating an alternative exemplary process 400 of partially swapping in and restoring branch prediction states 138(0)-138(B) in the private branch prediction memory 136 from the shared branch prediction memory 142 but the branch prediction circuit 134 still able to make branch predictions based on a partial restoration of branch prediction states 138(0)-138(B). The process 400 in FIG. 4 can follow from, for example, the process 200 in FIG. 2, and start after the processes of swapping branch prediction states in and out in blocks 210 and 212 in FIG. 2 have been initiated. In this regard, as illustrated in FIG. 4, the branch prediction circuit 134 is configured to determine if the swapping in and storing of the branch prediction states 146( )(0)-146( )(B) in the shared branch prediction memory 142) for the swapped-in context into the private branch prediction memory 136 is completed (block 402 in FIG. 4). In response to determining the storing of the branch prediction states 146( )(0)-146( )(B) from the shared branch prediction memory 142 into the private branch prediction memory 136 is not completed (block 404 in FIG. 4), the branch prediction circuit 134 is still configured to speculatively predict an outcome of a branch instruction 106F in the swapped-in, current process executing in the instruction processing circuit 104 based on an alternative branch prediction state (block 406 in FIG. 4). For example, the branch prediction circuit 134 can be configured to speculatively predict the outcome of a fetched branch instruction 106F in the swapped-in, current process executing in the instruction processing circuit 104 before the storing of the branch prediction states 146( )(0)-146( )(B) from the shared branch prediction memory 142 into the private branch prediction memory 136 is completed based on a static branch prediction state, such as always taken or not taken.

If, however, in response to determining the storing of the branch prediction states 146( )(0)-146( )(B) from the shared branch prediction memory 142 into the private branch prediction memory 136 is completed (block 408 in FIG. 4), the branch prediction circuit 134 can be configured to speculatively predict the outcome of a branch instruction 106F in the swapped-in, current process executing in the instruction processing circuit 104 using branch prediction states 146( )(0)-146( )(B) from the shared branch prediction memory 142 that are stored as the branch prediction states 138(0)-138(B) in the private branch prediction memory 136 as previously discussed above (block 410 in FIG. 4).

Alternative to blocks 404 and 406 in FIG. 4, another "lazy" swapping method involves the branch prediction circuit 134 storing only a subset or less than all of the prediction states 146( )(0)-146( )(B) associated with the new context 144(0)-144(C) in the branch prediction states 138 (0)-138(B) in the private branch prediction memory 136 without completely storing all branch prediction states 146( )(0)-146( )(B) of the private branch prediction memory 136. Also, the branch prediction circuit 134 can be configured to store only a subset or less than all of the prediction states 138(0)-138(B) associated with the current context in the shared branch prediction memory 142. This allows the branch prediction circuit 134 to speculatively predict outcomes of branch instructions 106F without having to swap in and out all the branch prediction states for the current and new contexts. The branch prediction circuit 134 can be configured to swap in the branch prediction states 146( )(0)-146( )(B) from the private branch prediction memory 136 that are more likely to supply accurate branch predictions of branch instructions 106F.

Alternatively, the branch prediction circuit 134 can be configured to speculatively predict the outcome of a branch instruction 106F in the swapped-in, current process executing in the instruction processing circuit 104 before the storing of the branch prediction states 146( )(0)-146( )(B) from the shared branch prediction memory 142 into the private branch prediction memory 136 is completed based on a branch prediction state in a separate dedicated shared branch prediction memory. This is shown by example in the processor-based system 500 in FIG. 5. The processor-based system 500 in FIG. 5 includes the same processor 102 as in the processor-based system 100 in FIG. 1. The same components between the processor-based system 100 in FIG. 1 and the processor-based system 500 in FIG. 5 are shown with common element numbers. The previously explanation of these elements above with regard to FIG. 1 are applicable for FIG. 5 and will not be re-described.

As shown in FIG. 5, the processor-based system 500 includes a shared branch prediction memory 542 that is similar to the shared branch prediction memory 142 in FIG. 1. The shared branch prediction memory 542 is sized to store multiple contexts 544(0)-544(C) for different processes that have executed in the processor 102 and may be swapped in to the instruction processing circuit 104 to be further executed. Each context 544(0)-544(C) is configured to store a plurality of branch prediction states 546(0)-546(B) in a corresponding plurality of entries 148 for the capacity of branch prediction states 138(0)-138(B) in the private branch prediction memory 136. The shared branch prediction memory 542 also includes a dedicated branch prediction memory 502 that is configured to store the plurality of branch prediction states 546(0)-546(B) in respective entries 548(0)-548(B) for a single context 544. In this example, the size 'S' of the entries 548(0)-548(B) in the dedicated branch prediction memory 502 is the same as the number of entries in a single context 544(0)-544(C) in the shared branch prediction memory 542. Thus, the branch prediction states 546(0)-546(B) in the dedicated branch prediction memory 502 can be accessed by the branch predictor circuit 134 to make speculative predictions about outcomes of branch instructions 106F until the swapping in of the branch prediction states 5460(0)-5460(B) from the shared branch prediction memory 542 into the private branch prediction memory 136 is completed.

FIG. 6 is a flowchart illustrating an exemplary process 600 of the branch prediction circuit 134 in the instruction processing circuit 104 in FIG. 1 configured to swap in a context from the shared branch prediction memory 542 to the private branch prediction memory 136 in place of a swapped-out context from the private branch prediction memory 136 to the shared branch prediction memory 542 and use the prediction states 546(0)-546(B) in the dedicated branch prediction memory 502 for making predictions until the swapping-in process is completed. This process 600 in FIG. 6 is discussed below in conjunction with the instruction processing circuit 104 in FIG. 5. In this regard, the branch prediction circuit 134 speculatively predicts an outcome of a fetched branch instruction 106F in a current process executing in the instruction processing circuit 104 (block 602 in FIG. 6). The speculative prediction can be based on an accessed associated branch prediction state 138(0)-138 (B) in the private branch prediction memory 136 for a context associated with the fetched branch instruction 106F of the current process executing in the instruction processing circuit 104 (block 602 in FIG. 6). As discussed previously, the private branch prediction memory 136 is configured to store branch prediction states 138(0)-138(B) for the current context of the current process being executed in the instruction processing circuit 104 of the processor 102.

With continuing reference to FIG. 6, the branch prediction circuit 134 receives the process ID 150 identifying a new context swapped or to be swapped into the instruction processing circuit 104 signifying a context switch (block 604 in FIG. 6). The branch prediction circuit 134 determines if the process ID 150 indicates a new context different from the current context swapped into the instruction processing circuit 104 (block 606 in FIG. 6). In response to the process ID 150 indicating the new context different from the current context swapped into the instruction processing circuit 104 (block 608 in FIG. 6), the branch prediction circuit 134 causes the branch prediction state 5460(0)-5460(B) associated with the new context 544(0)-544(C) to be stored in the branch prediction states 138(0)-138(B) in the private branch prediction memory 136 (block 610 in FIG. 6). Also, in response to the process ID 150 indicating the new context different from the current context swapped into the instruction processing circuit 104, the branch prediction circuit 134 causes the branch prediction states 138(0)-138(B) in the private branch prediction memory 136 for the current context to be swapped out to be stored as the branch prediction states 5460(0)-5460(B) of its context 544(0)-544(C) in the shared branch prediction memory 542 (block 612 in FIG. 6).

With continuing reference to FIG. 6, the branch prediction circuit 134 is configured to determine if the swapping in and storing of the branch prediction states 5460(0)-5460(B) in the shared branch prediction memory 542) for the swapped-in context into the private branch prediction memory 136 is completed (block 614 in FIG. 6). In response to determining the storing of the branch prediction states 5460(0)-5460(B) from the shared branch prediction memory 542 into the private branch prediction memory 136 is not completed (block 616 in FIG. 6), the branch prediction circuit 134 is still configured to speculatively predict an outcome of a branch instruction 106F in the swapped-in, current process executing in the instruction processing circuit 104 based on the branch prediction states 546(0)-546(B) in the dedicated branch prediction memory 502 associated with the branch instruction 106F (block 618 in FIG. 6). However, in response to determining the storing of the branch prediction states 5460(0)-5460(B) from the shared branch prediction memory 542 into the private branch prediction memory 136 is completed (block 620 in FIG. 6), the branch prediction circuit 134 can be configured to speculatively predict the outcome of a branch instruction 106F in the swapped-in, current process executing in the instruction processing circuit 104 using branch prediction states 5460(0)-5460(B) from the shared branch prediction memory 542 that are stored as the branch prediction states 138(0)-138(B) in the private branch prediction memory 136 as previously discussed above (block 622 in FIG. 6).

Another alternative of a branch prediction circuit speculatively predicting an outcome of a branch instruction 106F based on a swapped-in branch conditions states into a private branch prediction memory in response to a context switch is illustrated in FIG. 7. FIG. 7 illustrates a processor-based system 700 that includes a processor 702 and instruction processing circuit 704 similar to the processor 102 and instruction processing circuit 104 in the processor-based system 100 in FIG. 1. The same components between the processor-based system 100 in FIG. 1 and the processor-based system 700 in FIG. 7 are shown with common element numbers. The previously explanation of these elements above with regard to FIG. 1 are applicable for FIG. 7 and will not be re-described.

In the processor-based system 700 in FIG. 7, the instruction processing circuit 704 includes two (2) identical branch prediction circuits, which can be the branch prediction circuit 134 from the instruction processing circuit 104 in FIG. 1 and a second branch prediction circuit 734. As will be discussed in more detail below, one branch prediction circuit 134, 734 is configured to hold the branch prediction states 138(0)-138(B), 738(0)-738(B) of the current context for the current processing being executed, while the other branch prediction circuit 734, 134 is configured to hold the branch prediction states 738(0)-738(B), 138(0)-138(B) of a next context for a next process more likely to be swapped in to the instruction processing circuit 704 be executed. In this manner, when a context switch occurs, if the process ID 150 identifying the process to be swapped is associated with context currently stored in the second branch prediction circuit 734, 134, the second branch prediction circuit 734, 134 can take over making speculative predictions in the instruction processing circuit 704 without delay. The first branch prediction circuit 134, 734, can be disabled and the new context for a process predicted to be more likely to be swapped in next can be loaded into its entries 140(0)-140(B), 740(0)-740(B) as its branch prediction states 138(0)-138(B), 738(0)-738(B). The branch prediction states 138(0)-138(B) in the first branch prediction circuit 134 can be swapped out into the shared branch prediction memory 142 and a new context associated with a new process predicted to be swapped into the instruction processing circuit 104 can next be swapped from the shared branch prediction memory 142 to the branch prediction memory 136 as previously described. However, when the context switch occurs, and the process ID 150 identifying the process to be swapped is not associated with the context currently stored in the second branch prediction circuit 734, 134, the branch prediction states 138(0)-138(B), 738(0)-738(B) in the second branch prediction circuit 734, 134 can be flushed and the branch prediction states 1440(0)-1440(B) for the new context stored in the shared branch prediction memory 142 can be swapped in to the first branch prediction circuit 134, 734, including according to any of the previously described techniques.

FIGS. 8A and 8B are flowcharts illustrating an exemplary process 800 of the instruction processing circuit 704 in FIG. 7 that includes the two branch prediction circuits 134, 734 and is configured to switch between the branch prediction circuits 134, 734 to speculatively predict outcomes of branch instructions 106F. In this regard, assuming the branch prediction circuit 134 is set to perform speculative predictions in the instruction processing circuit 704, the branch prediction circuit 134 speculatively predicts an outcome of a fetched branch instruction 106F in a current process executing in the instruction processing circuit 104 (block 802 in FIG. 8A). The speculative prediction can be based on an accessed associated branch prediction state 138(0)-138(B) in the private branch prediction memory 136 for a context associated with the fetched branch instruction 106F of the current process executing in the instruction processing circuit 104 (block 802 in FIG. 8A). As discussed previously, the first private branch prediction memory 136 is configured to store branch prediction states 138(0)-138(B) for the current context of the current process being executed in the instruction processing circuit 104 of the processor 102.

With continuing reference to FIG. 8A, the instruction processing circuit 704 receives the process ID 150 identifying a new context swapped or to be swapped into the instruction processing circuit 104 signifying a context switch (block 804 in FIG. 8A). The instruction processing circuit 704 determines if the process ID 150 indicates a new context different from the current context swapped into the instruction processing circuit 104 (block 806 in FIG. 8A). In response to the process ID 150 indicating the new context different from the current context swapped into the instruction processing circuit 104 (block 808 in FIG. 8A), the instruction processing circuit 704 is further configured to determine if the new context is associated with the branch prediction states 738(0)-738(B) stored in the second private branch prediction memory 736 of the second branch prediction circuit 734 (block 810 in FIG. 8A). If so, the instruction processing circuit 704 is configured to switch from the first branch prediction circuit 134 to the second branch prediction circuit 734 to cause the second branch prediction circuit 734 to speculatively predict an outcome of a branch instruction 106F in the next process executing in the instruction processing circuit 704, based on a branch prediction state 738(0)-738(B) in the next context in the second private branch prediction memory 736 associated with the branch instruction 106F (block 812 in FIG. 8A). Thus, the second private branch prediction memory 736 can start speculatively predicting outcomes of branch instructions 106F for the next process without having to wait for branch prediction states for the next context to be swapped into its second private branch prediction memory 736. Also, if the new context is associated with the branch prediction states 738(0)-738(B) stored in the second private branch prediction memory 736 of the second branch prediction circuit (block 810 in FIG. 8A), the branch prediction circuit 134 is further configured to discontinue speculatively predicting an outcome of a branch instruction 106F in the next process executing in the instruction processing circuit 104 (block 814 in FIG. 8B). The instruction processing circuit 704 is further configured to swap out the branch prediction states 138(0)-138(B) in the branch prediction memory 136 to the branch prediction states 146(0)-146(B) for the current context 144(0)-144(C) in the shared branch prediction memory 142 as previously discussed (block 816 in FIG. 8B). The instruction processing circuit 704 is also further configured to swap in the branch prediction states 146(0)-146(B) for the context 144(0)-144(C) of a next speculated context to be swapped into the instruction processing circuit 704 next from the shared branch prediction memory 142 to the private branch prediction memory 136 (block 818 in FIG. 8B).

If, however, the new context is not associated with the branch prediction states 738(0)-738(B) stored in the second private branch prediction memory 736 of the second branch prediction circuit 734 (block 810 in FIG. 8A), the instruction processing circuit 704 is configured to flush the branch prediction states 738(0)-738(B) associated with the next context in the second private branch prediction memory 736 (block 820 in FIG. 8B). This is so that the branch prediction states 146(0)-146(B) of a next speculated context 144(0)-144(C) to be swapped in can be loaded into the second private branch prediction memory 736. The branch prediction circuit 134 will continue to speculatively predict outcomes of branch instructions 106F for the new process swapped into the instruction processing circuit 704 (block 822 in FIG. 8B). The instruction processing circuit 704 is configured to swap out the branch prediction states 738(0)-738(B) in the private branch prediction memory 136 to the shared branch prediction memory 142 as previously discussed (block 816 in FIG. 8B). The instruction processing circuit 704 is also further configured to swap in the branch prediction states 146(0)-146(B) for the context 144(0)-144(C) of a new context swapped into the instruction processing circuit 704 from the shared branch prediction memory 142 to the private branch prediction memory 136 (block 818 in FIG. 8B).

Note that any of the operations discussed above with regard to swapping out contexts from the private branch prediction memory 136, 736 to the shared branch prediction memory 142, 542, 742, and swapping in contexts from a shared branch prediction memory 142, 542, 742 to the private branch prediction memory 136, 736, can be performed in the instruction processing circuit 104 and/or elsewhere within the processor(s) 102, 702.

FIG. 9 is a block diagram of an exemplary processor-based system 900 that includes a processor 902 (e.g., a microprocessor) that includes an instruction processing circuit 904. The instruction processing circuit 904 can be any of the instruction processing circuits 104 in the processors 102 in FIGS. 1, 5, and 7 as examples, and include a branch prediction circuit 906 configured to speculatively predict outcomes of branch instructions to be executed, and that includes a private branch prediction memory configured to store branch prediction states to be accessed to make such predictions. The processor-based system 900 can be any of the processor-based systems 100, 500, and 700 in FIGS. 1, 5, and 7 as examples and can include a shared branch prediction memory to be used for swapping in and out contexts in response to context switches in the processor 902, including the shared branch prediction memories 142, 542, and 742 in FIGS. 1, 5, and 7 as examples. The processor-based system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 900 includes the processor 902. The processor 902 represents one or more general-purpose processing circuits, such as a microprocessor, central processing unit, or the like. More particularly, the processor 902 may be an EDGE instruction set microprocessor, or other processor implementing an instruction set that supports explicit consumer naming for communicating produced values resulting from execution of producer instructions. The processor 902 is configured to execute processing logic in instructions for performing the operations and steps discussed herein. In this example, the processor 902 includes an instruction cache 908 for temporary, fast access memory storage of instructions accessible by the instruction processing circuit 904. Fetched or prefetched instructions from a memory, such as from the system memory 910 over a system bus 912, are stored in the instruction cache 908. The instruction processing circuit 904 is configured to process instructions fetched into the instruction cache 908 and process the instructions for execution. The system memory 910 can include a shared branch prediction memory 911, such as shared branch prediction memories 142, 542, and 742 in FIGS. 1, 5, and 7 as examples.

The processor 902 and the system memory 910 are coupled to the system bus 912 and can intercouple peripheral devices included in the processor-based system 900. As is well known, the processor 900 communicates with these other devices by exchanging address, control, and data information over the system bus 912. For example, the processor 902 can communicate bus transaction requests to a memory controller 914 in the system memory 910 as an example of a slave device. Although not illustrated in FIG. 9, multiple system buses 912 could be provided, wherein each system bus constitutes a different fabric. In this example, the memory controller 914 is configured to provide memory access requests to a memory array 916 in the system memory 910. The memory array 916 is comprised of an array of storage bit cells for storing data. The system memory 910 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 912. As illustrated in FIG. 9, these devices can include the system memory 910, one or more input device(s) 918, one or more output device(s) 920, a modem 922, and one or more display controllers 924, as examples. The input device(s) 918 can include any type of input device, including but not limited to input keys, switches, voice processors, etc. The output device(s) 920 can include any type of output device, including but not limited to audio, video, other visual indicators, etc. The modem 922 can be any device configured to allow exchange of data to and from a network 926. The network 926 can be any type of network, including but not limited to a wired or wireless network, a private or public network, a local area network (LAN), a wireless local area network (WLAN), a wide area network (WAN), a BLUETOOTH™ network, and the Internet. The modem 922 can be configured to support any type of communications protocol desired. The processor 902 may also be configured to access the display controller(s) 924 over the system bus 912 to control information sent to one or more displays 928. The display(s) 928 can include any type of display, including but not limited to a cathode ray tube (CRT), a liquid crystal display (LCD), a plasma display, etc.

The processor-based system 900 in FIG. 9 may include a set of instructions 930 to be executed by the processor 902 for any application desired according to the instructions. The instructions 930 may be stored in the system memory 910, processor 902, and/or instruction cache 908 as examples of a non-transitory computer-readable medium 932. The instructions 930 may also reside, completely or at least partially, within the system memory 910 and/or within the processor 902 during their execution. The instructions 930 may further be transmitted or received over the network 926 via the modem 922, such that the network 926 includes the computer-readable medium 932.

While the computer-readable medium 932 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A branch prediction circuit, comprising:
a private branch prediction memory configured to store at least one branch prediction state for a current context of a current process executing in an instruction processing circuit of a processor;
the branch prediction circuit configured to:
speculatively predict an outcome of a branch instruction in the current process executing in the instruction processing circuit, based on a branch prediction state among the at least one branch prediction state in the current context in the private branch prediction memory associated with the branch instruction;
receive a process identifier identifying a new context swapped into the instruction processing circuit; and
in response to the process identifier indicating the new context different from the current context swapped into the instruction processing circuit:
cause at least one branch prediction state associated with the new context to be stored as at least one branch prediction state in the private branch prediction memory.

2. The branch prediction circuit of claim 1 further configured to, in response to the process identifier indicating the new context different from the current context swapped into the instruction processing circuit, cause at least one branch prediction state in the private branch prediction memory to be stored as at least one branch prediction state in a shared branch prediction memory, the shared branch prediction memory configured to store at least one branch prediction state associated with a context among each of a plurality of contexts.

3. The branch prediction circuit of claim 1 further configured to, in response to the process identifier indicating the new context different from the current context swapped into the instruction processing circuit, not cause the at least one branch prediction state stored in the shared branch prediction memory to be flushed.

4. The branch prediction circuit of claim 1 configured to, in response to the process identifier indicating the new context different from the current context swapped into the instruction processing circuit:
cause at least one branch prediction state associated with the new context in a shared branch prediction memory configured to store at least one branch prediction state associated with a context among each of a plurality of contexts to be stored as at least one branch prediction state in the private branch prediction memory.

5. The branch prediction circuit of claim 4 configured to, in response to the process identifier indicating the new context different from the current context swapped into the instruction processing circuit:
cause each of the at least one branch prediction states associated with the new context in the shared branch prediction memory to be stored as at least one branch prediction state in the private branch prediction memory.

6. The branch prediction circuit of claim 4 further configured to, in response to the process identifier indicating the new context different from the current context swapped into the instruction processing circuit, cause at least one branch prediction state in the private branch prediction memory to be stored as at least one branch prediction state in the shared branch prediction memory.

7. The branch prediction circuit of claim 6 further configured to, in response to the process identifier indicating the new context different from the current context swapped into the instruction processing circuit:
cause each of the at least one branch prediction states in the private branch prediction memory to be stored as at least one branch prediction state in the shared branch prediction memory.

8. The branch prediction circuit of claim 4 further configured to, in response to the process identifier indicating the new context different from the current context swapped into the instruction processing circuit:
determine if the at least one branch prediction state in the shared branch prediction memory stored in the private branch prediction memory is completed; and in response to determining the storing of the at least one branch prediction state from the shared branch prediction memory into the private branch prediction memory is not completed:
speculatively predict an outcome of a branch instruction in the current process executing in the instruction processing circuit based on a static branch prediction state.

9. The branch prediction circuit of claim 8 further configured to, in response to determining the storing of the at least one branch prediction state from the shared branch prediction memory into the private branch prediction memory is completed:
speculatively predict an outcome of a branch instruction in the current process executing in the instruction processing circuit based on the branch prediction state among the at least one branch prediction state in the private branch prediction memory associated with the branch instruction.

10. The branch prediction circuit of claim 4 further configured to, in response to the process identifier indicating the new context different from the current context swapped into the instruction processing circuit:
determine if the at least one branch prediction state in the shared branch prediction memory stored in the private branch prediction memory is completed; and
in response to determining the storing of the at least one branch prediction state from the shared branch prediction memory into the private branch prediction memory is not completed:
speculatively predict an outcome of a branch instruction in the current process executing in the instruction processing circuit based on the branch prediction state among the at least one branch prediction state in a dedicated shared branch prediction memory associated with the branch instruction, the dedicated shared branch prediction memory configured to store at least one branch prediction state associated with one context comprising the current context.

11. The branch prediction circuit of claim 10 further configured to, in response to determining the storing of the at least one branch prediction state from the shared branch prediction memory into the private branch prediction memory is completed:
speculatively predict an outcome of a branch instruction in the current process executing in the instruction processing circuit based on the branch prediction state among the at least one branch prediction state in the private branch prediction memory associated with the branch instruction.

12. The branch prediction circuit of claim 4, wherein:
the private branch prediction memory is configured to store a plurality of branch prediction states for a current context of a current process executing in the instruction processing circuit of the processor;
the branch prediction circuit is configured to:
speculatively predict an outcome of a branch instruction in the current process executing in the instruction processing circuit, based on a branch prediction state among the plurality of branch prediction states in the current context in the private branch prediction memory associated with the branch instruction; and
in response to the process identifier indicating the new context different from the current context swapped into the instruction processing circuit:
cause at least one branch prediction state less than all of the plurality of branch prediction states associated with the new context in the shared branch prediction memory configured to store the plurality of branch prediction states associated with a context among each of the plurality of contexts to be stored as at least one branch prediction state less than all of the plurality of branch prediction states in the private branch prediction memory.

13. The branch prediction circuit of claim 12 further configured to, in response to the process identifier indicating the new context different from the current context swapped into the instruction processing circuit:
cause at least one branch prediction state less than all of the plurality of branch prediction states in the private branch prediction memory to be stored as at least one branch prediction state less than all of the plurality of branch prediction states in the shared branch prediction memory.

14. The branch prediction circuit of claim 1, wherein the private branch prediction memory comprises a branch prediction table circuit comprising at least one branch prediction entry each configured to store the branch prediction state:
the branch prediction circuit configured to speculatively predict the outcome of a branch instruction in the current process executing in the instruction processing circuit, based on a branch prediction state in a branch prediction entry among the at least one branch prediction entry of the current context in the private branch prediction memory associated with the branch instruction.

15. A method of predicting a branch instruction for a context executing in an instruction processing circuit of a processor, comprising:
speculatively predicting an outcome of a branch instruction in a current process executing in the instruction processing circuit, based on a branch prediction state among at least one branch prediction state of a current context of the current process in a private branch prediction memory associated with the branch instruction, the private branch prediction memory configured to store at least one branch prediction state for the current context of the current process to be executed in an instruction processing circuit of a processor;
receiving a process identifier identifying a new context swapped into the instruction processing circuit;
determining if the process identifier indicates a new context different from the current context swapped into the instruction processing circuit; and
causing at least one branch prediction state associated with the new context to be stored as at least one branch prediction state in the private branch prediction memory, in response to the process identifier indicating the new context different from the current context swapped into the instruction processing circuit.

16. The method of claim 15, further comprising causing at least one branch prediction state in the private branch prediction memory to be stored as at least one branch prediction state in a shared branch prediction memory, in response to the process identifier indicating the new context different from the current context swapped into the instruction processing circuit.

17. The method of claim 15, further comprising not causing the at least one branch prediction state stored in the shared branch prediction memory to be flushed, in response to the process identifier indicating the new context different from the current context swapped into the instruction processing circuit.

18. A processor-based system, comprising:
a processor, comprising:
   an instruction processing circuit comprising:
      one or more instruction pipelines comprising a fetch circuit, a branch prediction circuit, and an execution circuit;
      the fetch circuit configured to fetch a plurality of instructions from a memory into an instruction pipeline among the one or more instruction pipelines to be executed by the execution circuit; and
      the branch prediction circuit comprising:
         a private branch prediction memory configured to store at least one branch prediction state for a current context to be executed in the instruction processing circuit of the processor;
      the branch prediction circuit configured to:
         speculatively predict an outcome of a branch instruction in a current process executing in the instruction processing circuit, based on a branch prediction state among the at least one branch prediction state in the current context in the private branch prediction memory associated with the branch instruction;
      the instruction processing circuit configured to:
         receive a process identifier identifying a new context swapped into the instruction processing circuit; and
         in response to the process identifier indicating the new context different from the current context swapped into the instruction processing circuit:
            cause at least one branch prediction state associated with the new context to be stored as at least one branch prediction state in the private branch prediction memory; and
   a shared branch prediction memory configured to store at least one branch prediction state associated with a context among each of a plurality of contexts associated with respective processes configured to be executed in the instruction processing circuit.

19. The processor-based system of claim 18, wherein the instruction processing circuit is further configured to, in response to the process identifier indicating the new context different from the current context swapped into the instruction processing circuit, cause at least one branch prediction state in the private branch prediction memory to be stored as at least one branch prediction state in the shared branch prediction memory.

20. The processor-based system of claim 18, wherein the processor is further configured to, in response to the process identifier indicating the new context different from the current context swapped into the instruction processing circuit, not cause the at least one branch prediction state for each of the plurality of associated contexts to be flushed.

21. The processor-based system of claim 19, wherein:
   the private branch prediction memory comprises a branch prediction table circuit comprising at least one branch prediction entry each configured to store a branch prediction state;
   the branch prediction circuit configured to speculatively predict an outcome of a branch instruction in the current context executing in the instruction processing circuit, based on a branch prediction state in a branch prediction entry among the at least one branch prediction entry in the private branch prediction memory associated with the branch instruction; and
   the shared branch prediction memory comprises a shared branch prediction table circuit comprising at least one branch prediction entry each configured to store a branch prediction state;
   the instruction processing circuit further configured to, in response to the process identifier indicating the new context different from the current context swapped into the instruction processing circuit, cause at least one branch prediction state in at least one branch prediction entry in the private branch prediction memory to be stored as at least one branch prediction state in at least one branch prediction entry in the shared branch prediction table circuit.

* * * * *